United States Patent
Agrawal et al.

(10) Patent No.: US 7,877,380 B2
(45) Date of Patent: Jan. 25, 2011

(54) SYSTEM FOR QUERY SCHEDULING TO MAXIMIZE WORK SHARING

(75) Inventors: Parag Agrawal, Stanford, CA (US);
Daniel Kifer, Sunnyvale, CA (US);
Chris Olston, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 341 days.

(21) Appl. No.: 12/036,956

(22) Filed: Feb. 25, 2008

(65) Prior Publication Data
US 2009/0216718 A1 Aug. 27, 2009

(51) Int. Cl.
G06F 7/00 (2006.01)
G06F 17/30 (2006.01)

(52) U.S. Cl. .................................. 707/718; 707/713
(58) Field of Classification Search ................. 703/13; 711/11; 705/27
See application file for complete search history.

(56) References Cited

U.S. PATENT DOCUMENTS

| | | | | |
|---|---|---|---|---|
| 6,021,463 A | * | 2/2000 | Belser | ........................ 711/114 |
| 7,552,041 B2 | * | 6/2009 | Lee et al. | ....................... 703/13 |
| 2006/0195896 A1 | * | 8/2006 | Fulp et al. | ..................... 726/11 |
| 2007/0174290 A1 | * | 7/2007 | Narang et al. | ................. 707/10 |
| 2007/0230340 A1 | * | 10/2007 | Serbest et al. | ............... 370/230 |

\* cited by examiner

*Primary Examiner*—Susan Y. Chen
(74) *Attorney, Agent, or Firm*—Stattler - Suh PC

(57) ABSTRACT

A system of query scheduling to maximize work sharing. The system schedules queries to account for future queries possessing a sharability component. Included in the system are operations for assigning an incoming query to a query queue based on a sharability characteristic of the incoming query, and evaluating a priority function for each member of a plurality of query queues to identify one highest priority query queue. The priority function accounts for the probability that a future incoming query will contain the sharability characteristic common to a member of the plurality of query queues. The system of query scheduling to maximize work sharing selects a batch of queries from the highest priority query queue, and dispatches the batch to one or more query execution units.

13 Claims, 7 Drawing Sheets

SYSTEM FOR QUERY SCHEDULING TO MAXIMIZE WORK SHARING

BACKGROUND OF THE INVENTION

1. Field of the Invention

The present invention is directed toward scheduling of execution of queries in a database query processing system, and more particularly toward scheduling of batches of queries under conditions of shared aspects of the queries.

2. Art Background

The Internet can be considered a massive database. In the context of analysis of various content derived from the Internet and from behaviors of users on the Internet, it may be useful to perform analysis on the results of queries, filters, joins, projections, etc. In some cases, producing the aforementioned results may require queries to large datasets as well as operations on large datasets. In some cases, the execution of queries may require very large computing resources, and even then, may require many real-time hours to obtain results. Conventional scheduling techniques such as shortest-job-first do not perform well in many practical situations. Moreover, as measured by total throughput, conventional scheduling techniques perform particularly poorly in situations where multiple queries share intermediate results. Hence, it is desirable to find ways to best schedule such queries.

SUMMARY OF THE INVENTION

The system of query scheduling to maximize work sharing schedules queries to account for future queries possessing a sharability component. Included in the system are operations for assigning an incoming query to a query queue based on a sharability characteristic of the incoming query, and evaluating a priority function for each member of a plurality of query queues to identify one highest priority query queue. The priority function accounts for the probability that a future incoming query will contain the sharability characteristic common to a member of the plurality of query queues. The system of query scheduling to maximize work sharing selects a batch of queries from the highest priority query queue, and dispatches the batch to one or more query execution units.

DETAILED DESCRIPTION

Query Scheduling to Maximize Work Sharing

In the following disclosure and discussion of the embodiments, it is described how best to schedule queries for execution if work can be shared across multiple queries (e.g., via multi-query optimization or cooperative scans). Conventional scheduling techniques such as shortest-job-first do not perform well in the presence of sharing. Hence, herein is disclosed a new family of scheduling policies specifically targeted to sharable workloads, and with a view toward minimizing perceived wait time (i.e. the time that queries spend waiting to execute and complete as perceived by the user).

Figure 1A:
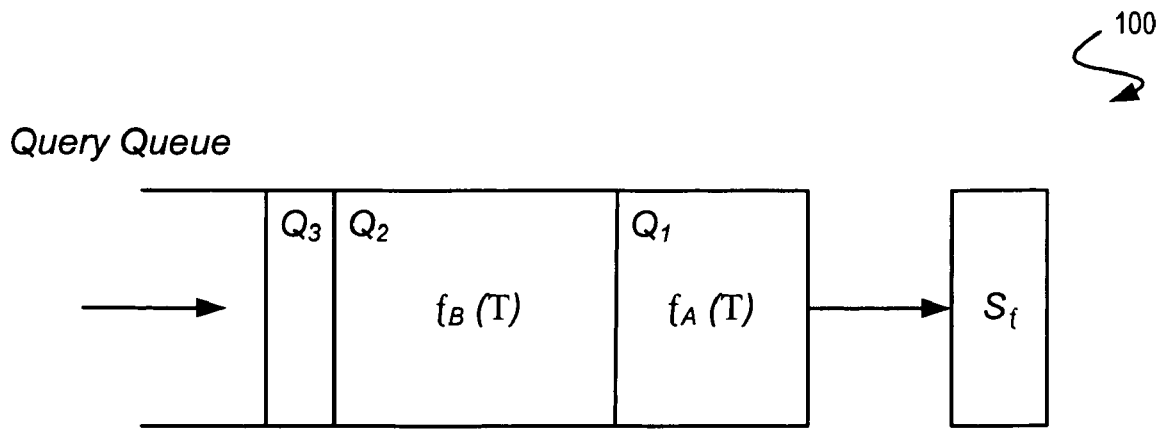
FIG. 1A is a depiction of a simplified query queue, according to some embodiments.

FIG. 1A depicts a query queue into which new queries enter from the left, and are selected for execution periodically by a query scheduler $S_f$. The relative runtimes of the queries $Q_1$, $Q_2$, and $Q_3$ are shown graphically. According to a strict first-in-first-out (FIFO) scheduling algorithm, the first-in query ($Q_1$) would be selected for execution before $Q_2$, since $Q_1$ arrived before $Q_2$. Similarly, $Q_2$ would be selected for execution before $Q_3$. From the perspective of the user who submitted $Q_3$, this is a bad algorithm inasmuch as it would be reasonable for $Q_3$, being much shorter than $Q_2$ and $Q_1$, to be executed first. Such a policy, termed shortest-job-first (SJF), operates by, at the moment of scheduling the next job, the shortest job in a queue is selected for execution. Relative to strict FIFO scheduling, SJF scheduling tends, on average, toward shorter wait times.

While SJF scheduling tends toward shorter wait times, on average, there are still significant improvements that can be made to the scheduling algorithm. In particular, scheduling algorithms that take into consideration shared activities or results can be shown to, on average, produce better results than SJF scheduling. It must be noted that not all queries necessarily possess shared activities with any other query.

In embodiments of a query processing system that can amortize work across related queries, one aspect of a technique to amortize work across related queries is to identify a set of queries with shared work or common sub-expressions. In one embodiment, the system selects from that set of queries and executes them in a combined fashion. In this scenario, the resulting combined execution time is less than the sum of the times it takes to execute each query when not combined, as is shown in the following examples.

Again referring to FIG. 1A, suppose query $Q_1$ requires scanning table T and then applying a function $f_A(\cdot)$ to each record of T. Suppose $Q_2$ requires scanning the same table T and applying a different function $f_B(\cdot)$. Say it takes 10 seconds to execute $Q_1$ by itself, 12 seconds to execute $Q_2$ by itself, and 16 seconds to execute $Q_1$ and $Q_2$ in combined fashion. The combined fashion execution time (16 seconds) is less than the sum of the individual execution times (10+12=22 seconds) because in the combined execution case, the processing time associated with scanning T is incurred only once instead of twice.

Informally, queries with common sub-expressions (e.g., a reference to a common table or a common scan operator) are henceforth referred to as sharable queries.

Figure 1B:
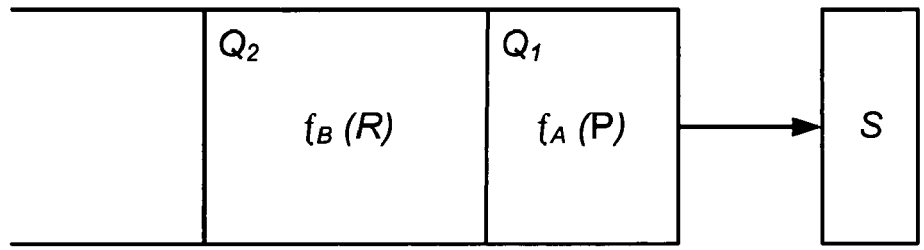
FIG. 1B is a depiction of a simplified query queue with a query scheduler, according to some embodiments.

Now referring to FIG. 1B suppose the system's query queue contains two pending queries, $Q_1$ and $Q_2$, which are unrelated (e.g., they scan different tables, namely P and R), and hence there is no benefit in executing them jointly; they may, therefore, execute sequentially. However a decision must be made as to which one to execute first. One possibility is to execute them in order of arrival (FIFO). Another possibility is to execute in order by SJF. Analyzing slightly more deeply, if $Q_1$ arrived slightly earlier and has a slightly shorter execution time than $Q_2$, then both FIFO and SJF schedulers would schedule $Q_1$ first. This decision, which may be made without taking shared work into account, seems reasonable because $Q_1$ and $Q_2$ are unrelated.

However, the system disclosed herein takes into account the likelihood and effect of soon-to-arrive queries. That is, the system disclosed herein may consider the fact that additional queries may arrive in the queue while $Q_1$ and $Q_2$ are being executed. Since future queries may be sharable with $Q_1$ and/or $Q_2$, that possibility can influence the optimal execution order of $Q_1$ and $Q_2$. Even if one does not anticipate the exact arrival schedule of future queries, a simple stochastic model including arrival rates of future query arrivals can influence the decision of which of $Q_1$ or $Q_2$ to execute first.

Continuing this example of FIG. 1B, if queries that are sharable with $Q_2$ occur very rarely and queries sharable with $Q_1$ are common, then all else being equal, $Q_2$ may be scheduled first. While $Q_2$ is executing, new queries that are sharable with $Q_1$ may arrive, permitting the system to amortize $Q_1$'s shared work across multiple queries. This amortization of work, in turn, improves system throughput and leads to lower average query response times.

In order to concisely describe this system, some terms, and the symbols used herein to refer to those terms, are presented in Table 1.

TABLE 1

Notation

| Symbol | Meaning |
|---|---|
| $P_{POLICY}$ | policy for scheduling queries that can share work |
| $F_i$ | ith query family |
| $t_i^s$ | sharable execution time for $F_i$ queries |
| $t_i^n$ | non-sharable execution time for $F_i$ queries |
| $\lambda_i$ | arrival rate of $F_i$ queries |
| $\beta_i$ | theoretical batch size for $F_i$ |
| $t_i$ | theoretical time to execute one $F_i$ batch |
| $T_i$ | theoretical scheduling period for $F_i$ |
| $f_i$ | theoretical processing fraction for $F_i$ |
| $\omega_i$ | perceived wait time for $F_i$ queries |
| $P_i$ | scheduling priority of $F_i$ |
| $L_i$ | queue length for $F_i$ |
| $W_i$ | waiting time of oldest enqueued $F_i$ query |

The following disclosure more formally introduces the notions of the quantities and characteristics presented herein and describes techniques as may be employed in various embodiments of the system of query scheduling to maximize work sharing.

Figure 1C:
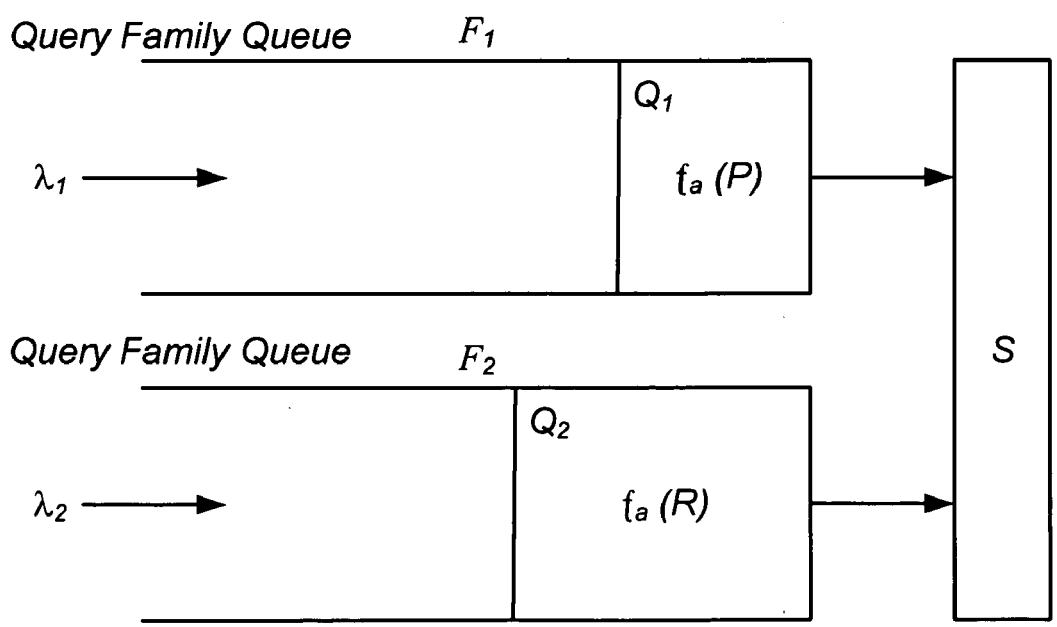
FIG. 1C is a depiction of multiple query family queues with a scheduler, according to some embodiments.

Beginning with the notion of arrival rates, one may now describe a first technique for estimating arrival rates. As shown in FIG. 1C, suppose $Q_1$ is a member of a query family of interrelated queries $F_1$ that are sharable with each other (e.g., they scan the same table P). And further suppose that $Q_2$ is a member of a different family $F_2$ (e.g., queries that scan a different table R). Knowledge of the relative popularities of P and R can be used to estimate the arrival rates of queries into the queue for query families $F_1$ and $F_2$. Arrival rate estimates, in turn, may then influence how to schedule queries currently in any of the queues. More intuitively, arrival rate estimates influence how long to 'hold off' on dispatching a related group of queries in expectation of the arrival of an additional query that has shared work with the other related group of queries.

Let $\lambda_i$ denote the arrival rate of queries in $F_i$. In the example, if the arrival rate estimates for $F_1$ and $F_2$ are such that that $\lambda_1 > \lambda_2$, then, all else being equal, the system may schedule $Q_2$ first because it is less likely that, within the time horizon of $\lambda_2$, another query will arrive in order to be able to amortize $Q_2$'s shared work with other queries compared to $Q_1$. Depending on the relative arrival times of $Q_1$ and $Q_2$, this schedule differs from the schedules produced by either FIFO or SJF.

In a more subtle scenario, suppose instead that $\lambda_1 = \lambda_2$. Further suppose P is 10 GB in size, and R is 100 GB in size. Assume for simplicity that the amount of sharable work is proportional to the size of the input table, and that the amount of non-sharable work is negligible (e.g., each query performs a simple in-memory computation on its input table).

Now, which one of $Q_1$ and $Q_2$ should be executed first? Perhaps $Q_1$ should be executed first because $Q_2$ benefits more from sharing, and postponing $Q_2$'s execution permits additional sharable $F_2$ queries to accumulate in the queue. On the other hand, perhaps $Q_2$ ought to be executed first since it takes ten times as long as $Q_1$, thereby allowing ten times as many $F_1$ queries to accumulate for future joint execution with $Q_1$.

The scheduler of the system described herein may consider these opposing factors in order to maximize system throughput, or minimize average query response time, or minimize based on any other minimization objective. In some embodiments, the system described herein may employ the technique of assigning queries to a query family. As will be shown, assignment of incoming queries to a query family greatly enhances the likelihood of producing a schedule that exploits the presence of shared activities among sharable queries.

Before the notion of a query family is formally introduced, the notion of a scheduling policy is introduced. The scheduling policy Ps follows the notion that, all else being equal, it is good to schedule non-sharable queries ahead of ones that can share work with future queries if the arrival rate of sharable future queries is expected to be high. When applying this policy in one or more embodiments of the scheduler described herein, the experimental results show that significant reductions in perceived wait time (PWT) are achieved compared with conventional scheduling approaches.

Various embodiments disclosed herein focus on scheduling in view of anticipated future queries. The unit of scheduling is a batch of related queries, and within each batch there exists shared work.

In practice, the quality of a schedule depends on several factors (such as maximum completion time, average completion time, maximum earliness, maximum lateness). Optimizing schedules with respect to several performance metrics is known as multi-criteria scheduling.

Figures 2A, 2B:
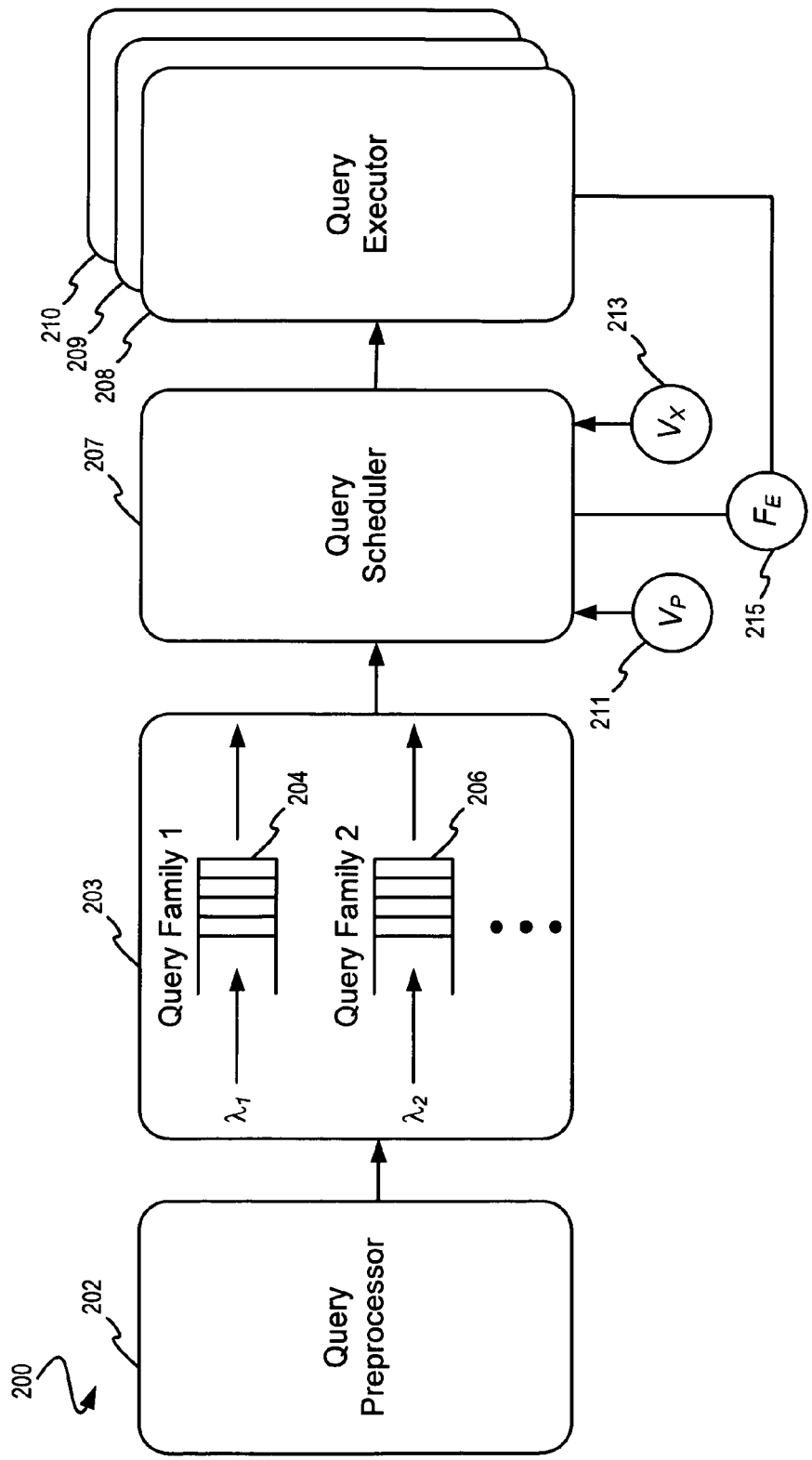
FIG. 2A is a depiction of a query scheduling system to maximize work sharing, according to some embodiments.
FIG. 2B is a depiction of a record for storing and sharing data, according to some embodiments.

Referring to FIG. 2A, one embodiment of a query evaluation system comprises a query preprocessor 202, an input queue 203 containing any number of query family queues 204, 206 that holds pending queries belonging to the respective query family, a query scheduler 207, and at least one query executor 208 that processes queries. Given the notion of a query family, it is useful to think of the input queue 203 as being divided into a set of smaller queues, one per query family 204, 206, as shown.

For the purpose of describing the operation of this system, let t(Q) denote the amount of time required for the executor to evaluate query Q. The executor is also able to execute a batch of queries Q={Q1,Q2, . . . ,Qn}. The time to execute batch Q is denoted by t(Q). A single executor processes one batch at a time in a serial fashion.

With the aforementioned definitions, then, given a pair of queries $Q_i$ and $Q_j$, $Q_i$ and $Q_j$ are defined as sharable if the execution time, when executed in combined fashion, is less than the execution time if executed individually without any technique for combining. More formally, $Q_i$ and $Q_j$ are sharable if and only if $t(\{Q_i, Q_j\}) < t(Q_i) + t(Q_j)$. Within the definitions herein sharability is a transitive relationship. Hence the universe of possible queries can be represented as a set of query families $F_1, F_2, \ldots F_n$ such that all pairs of queries selected from the same family $F_i$ are deemed sharable, and no pairs of queries from any other family $F_n$ (n not equal to i) families are deemed sharable with queries from $F_i$. For example, query families might correspond to different input tables, where queries that read the same set of input tables (or, more particularly, ones that use the same access methods) are sharable. In practice, while an incoming query may be deemed sharable with previously queued queries in a particular query family queue, the incoming query may in fact reference the same input tables or use the same access methods of queries in a different query queue family.

Various embodiments of the system of FIG. 2A employ techniques for the query preprocessor 202 to assign a query to a query family queue 204, 206. Further various embodiments of the system of FIG. 2A employ techniques for the query scheduler to select a batch and assign the batch to at least one query executor 208, 209, 210. It must be noted that a batch is further defined as containing an integer number of queries found in the input queue. From this refined definition of a batch, then, let $T_B$ equal the time to execute a batch of n queries from family $F_i$. Then $T_B = t_i^s + (n \cdot t_i^n)$, where $t_i^s$ represents the sharable component of the execution time and $t_i^n$ represents the non-sharable component. Strictly as an example, the sharable component may correspond to the time spent scanning the input table(s), while the non-sharable component corresponds to query-specific computation time.

In embodiments of the query preprocessor, preferred techniques assign queries to a given query family queue $F_i$ where $t_i^s$ is large relative to $t_i^n$. In other words, if an incoming query is only marginally sharable with the queries in a candidate query family, the incoming query is not placed into that candidate family, but instead a new candidate query family queue is assigned and further incoming queries are evaluated for sharability against queries in the new candidate query family queue, and so on until the best fit (within a threshold range) is found.

FIG. 2A depicts an embodiment of a system for managing queries for execution 200. Various embodiments of the system of FIG. 2A employ techniques for the query preprocessor 202 to assign a query to a query family queue. It must be noted that the aforementioned techniques include techniques for the query preprocessor 202 to assign a query to a query family queue that may perform the calculation once per incoming query (e.g., triggered by an incoming query), or the calculation may be performed periodically. In some embodiments, the calculation may include terms for comparing the sharability of an incoming query as compared to queries enqueued in a query family queue as well as terms for the sharability of an incoming query as compared to queries still being executed or still being cached in the query execution unit. In some embodiments, the query preprocessor 202 is operable to create, retain and destroy query family queues based on thresholds and time-varying metrics. More particularly, query family queues may be created if there are no query family queues in existence, or when the sharability of an incoming query as across all existing query family queues is below a certain sharability threshold. Query family queues, once created may be retained (i.e. not destroyed) if they had ever contained a number of queries greater than a certain popularity threshold. Conversely query family queues may be destroyed if they had never contained a number of queries greater than a certain popularity threshold. Of course it is possible that an incoming query may be deemed to be unsharable with any queries in any existing query family queues, and prophetically unsharable with future incoming queries. In such a case, a new singleton query family queue may be created and the incoming query then scheduled by the scheduler (discussed infra) as a singleton batch. In practice, the sharability of a query deemed to be unsharable is assigned to a small (but non-zero) constant.

Various embodiments of a query scheduler implement techniques whereby a set of numeric values can be calculated and used in the relative assessment of the predicted performance of execution of a particular selection of a group of queries (a batch) versus another batch of queries. The notion of performance is itself somewhat subjective. That is, one evaluator might consider performance to mean achieving the absolute shortest start-to-finish time. Another evaluator might consider performance to carry the meaning of achieving the smallest difference between the actual start-to-finish as compared to the minimum theoretically possible start-to-finish. Still another evaluator might consider performance optimized when the longest start-to-finish time is minimized.

Various embodiments of a query scheduler implement techniques to minimize the perceived wait time (PWT) of queries in steady state with an infinite time horizon. More formally, PWT of a query Q is the difference between the system's response time in handling Q and the minimum possible response time t(Q). The term response time is the total delay time between submission and completion of a query.

Informally, average PWT is a measure of how unhappy users are, on average, due to query processing delays. Additionally, embodiments consider the maximum PWT of any query, which indicates how unhappy the least happy user is.

PWT for a query Q can be measured on an absolute scale as the difference between the system's response time and the minimum possible response time (e.g., 10 minutes), or on a relative scale as the ratio of the system's response time to the minimum possible response time (e.g., 1.5×t(Q)).

The space of PWT metric variants is shown in Table 2. For convenience, the following disclosure adopts the abbreviations AA, MA, AR, and MR to refer to the four variants.

TABLE 2

| | PWT Variants | |
|---|---|---|
| | Average | Maximum |
| Absolute | AA | MA |
| Relative | AR | MR |

These quadrants are theoretical in nature, and the desired optimization function might be some combination of these theoretical minimization objectives. In other words, given that performance is subjective (yet some embodiments rely on purely objective techniques for measurement of performance), an objective expression for hybrid performance (HP) must be defined. Strictly as an example, and using a combination of exactly two minimization objectives, hybrid performance (in this example using AA and MA) can be defined mathematically as:

$$HP_{AA:MA} = p(AA) + (1-p)(MA)$$

where p is a number between 0 and 1. By inspection, if p is assigned a value of 1, then the HP considers only AA. If p is assigned a value of 0, then the HP considers only MA.

In the embodiment of a system for managing queries for execution 200 as shown in FIG. 2A, the query scheduler 207 includes a variable $V_p$ 211, which is capable of presenting to the query scheduler the value of p as described in the above equation for HP. As shown in the embodiment of a system for managing queries for execution 200, the query scheduler 207 includes a variable pool $V_x$ 213, which is capable of presenting to the query scheduler any one or more of the value(s) of $V_x$. Optionally, the query scheduler 207 includes input(s) from the query executors 208, 209, 210, any or all of which are capable of presenting to the query scheduler the value(s) produced by the function $F_E$ 215.

In embodiments of the system of FIG. 2A, it may be convenient to represent a plurality of values pertaining to the query in a collection or an object or a record 250. In simplified form, such a collection or an object or a record is shown in FIG. 2B. Such a record is optional, but may contain data values or data representations 252, 254, 256, 258, 260 that are convenient for storing and/or passing data between any of the operations executed within the context of the system of FIG. 2A. FIG. 2B depicts an exemplary set of data items that may be carried in such a record 250.

Figure 3:
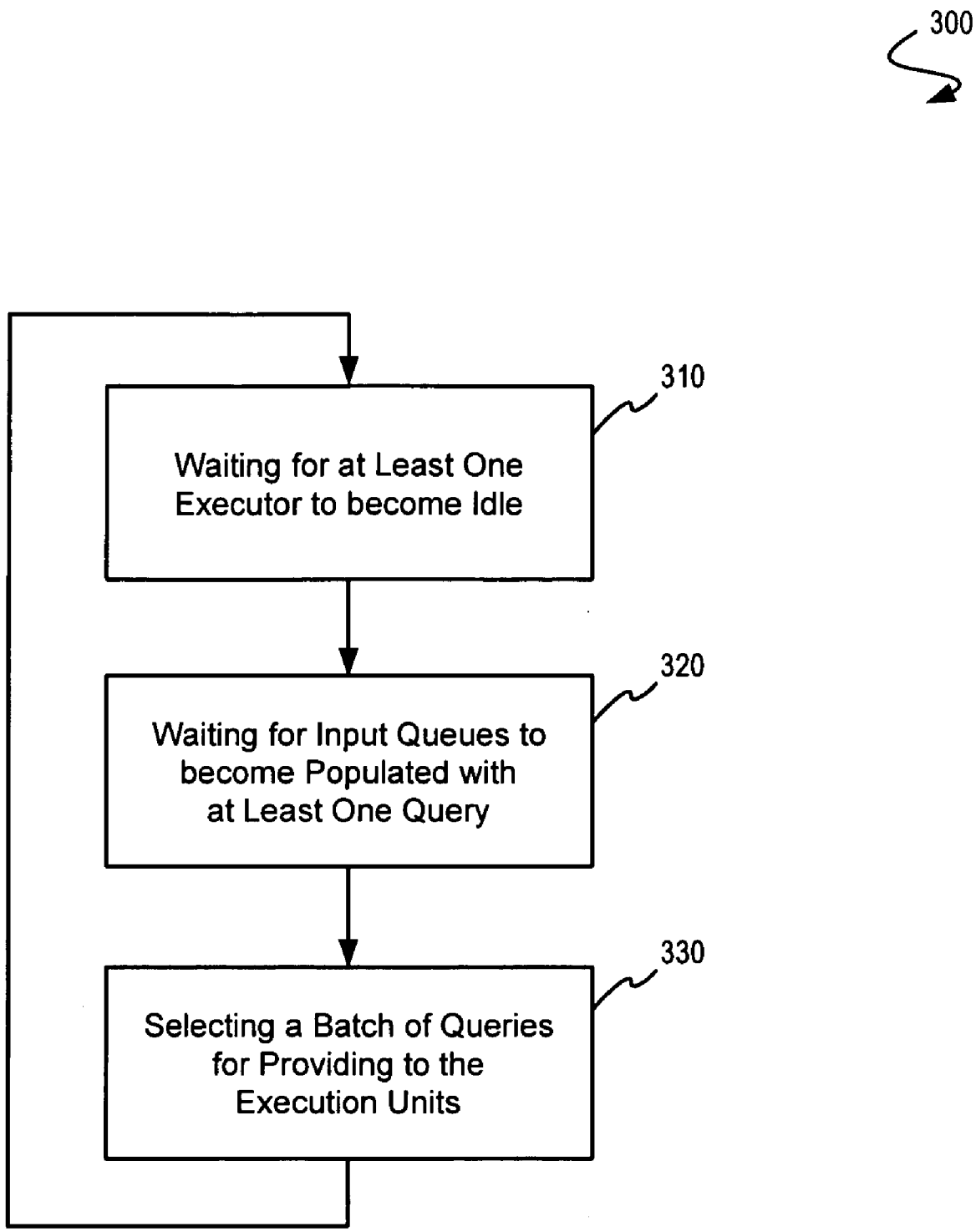
FIG. 3 is a depiction of a method for performing a scheduling policy, according to some embodiments.

FIG. 3 depicts a method for performing a scheduling policy 300. As shown, the method for performing a scheduling policy has an operation to wait for at least one query executor to become idle 310. The operation to wait for at least one query family queue to become non-empty 320 may conclude immediately upon occurrence of at least one query in at least one queue family, or it might wait for a finite amount of time in prediction that additional queries might arrive. The method for performing a scheduling policy 300 has an operation to select a batch of queries for providing to a query execution unit 330. In various embodiments, an operation to select a batch of queries for providing to a query execution unit may collect some or all of the queries in a particular query family queue into a batch. In some embodiments the 'next' query family queue is selected in a sequential round-robin fashion. In other embodiments, each query family queue is assigned a priority, and all queries in a query family queue of a higher priority are executed until empty before any query family queue of a lower priority is selected. In still other embodiments, round-robin scheduling is combined with priority scheduling and a lockout prevention mechanism, and a tie-breaking mechanism. All such techniques are well known to those skilled in the art. As shown in FIG. 3, the method can be implemented as a series of steps whereby one step is executed after another, however in other embodiments, the order of execution of one operation does not depend strictly on the completion of any other step. In fact, both pipelined embodiments (as shown in the system of FIG. 2A) and fully-parallel/fully-asynchronous implementations are preferred.

Turning one's attention to further details of the operation for providing a batch of queries to one or more query execution units 330, a group of queries (i.e., a batch) is selected and passed as a batch for execution. In some cases enqueued queries from different query family queues may be selected as a batch. In preferred embodiments, whenever a query family $F_i$ is scheduled for execution, all enqueued queries from a single family $F_i$ are included in the execution batch. While it is true that if $t^n > t^s$, a lower average absolute PWT may be achieved by scheduling queries sequentially instead of in a batch, in preferred embodiments query families are query families containing queries for which $t^s > t^n$. In terms of average absolute PWT of queries in the batch, if $t^s > t^n$, it is always beneficial to form large batches. In all cases, large batches reduce the wait time of queries that are executed after the large batch is executed.

Performance of the system 200 is dependent on many variables, including the selection techniques employed in the operation to select a batch of queries for execution 330. In preferred embodiments, the aforementioned techniques involve application of one or more scheduling policies in order to arrive at an objective function for hybrid performance.

In particular, note that in optimizing solely for average wait time, there may be certain queries with very high PWT. Conversely, optimizing solely for the maximum, such an optimization objective would end up punishing the majority of queries in order to help out a few outlier queries. In one embodiment, an objective function for hybrid performance includes optimization for a combination of average and maximum PWT.

As disclosed supra, hybrid performance involving the priority function for average absolute PWT (AA) and maximum absolute PWT (MA) is:

$$HP_{AA:MA} = p(AA) + (1-p)(MA)$$

where p is a number between 0 and 1.

The following paragraphs develop a mathematical description of the priority function for each of average absolute PWT and maximum absolute PWT.

Before turning to the disclosure of the priority functions for each of average absolute PWT and maximum absolute PWT, the applicability of the previously mentioned SJF policy can be characterized. Of note, if there is no sharing, low average absolute PWT is achieved via SJF scheduling and its variants. The following paragraphs generalize SJF in the case of sharable queries:

Let $P_i$ denote the scheduling priority of family $F_i$. If there is no sharing, SJF sets $P_i$ equal to the time to complete one query. If there is sharing, then let $P_i$ equal the average per-query execution time of a query batch. Suppose $B_i$ is the number of enqueued queries in family $F_i$; in other words, the current batch size for $F_i$. Then the total time to execute a batch $T_B$ is $t_i^s + B_i \cdot t_i^n$. The average per-query execution time is $(t_i^s + B_i \cdot t_i^n)/B_i$, which gives us the SJF scheduling priority policy $P_{SJF}$:

$$P_{SJF}: P_i = -((t_i^s/B_i) + t_i^n)$$

Unfortunately, SJF does not work well in the presence of sharing. Since SJF does not always produce good schedules in the presence of sharing, and since in practical target workloads there is significant opportunity for sharing, an alternate scheduling technique that is both practical and also generally produces good schedules in the presence of sharing is needed. Unfortunately, solving even the non-shared scheduling problem exactly is NP-hard. Hence, to make this problem tractable and suited for implementation in real systems, the derivations below consider a relaxed mathematical representation of the problem (i.e., using Relaxation #1, or Relaxation #2 introduced infra). Also the disclosure below derives a mathematical representation of the optimal solution applied to the relaxed problem, which is then applied to the original problem.

Relaxation #1

In Relaxation #1, each query family 204, 206 has a dedicated executor. The total work done by all executors in steady state is constrained to be less than or equal to the total work performed by the one executor in the original problem. Furthermore, rather than discrete queries, Relaxation #1 treats queries as continuously arriving, i.e., infinitely divisible units of work. Henceforth the terms "Relaxation #1" and "Governed Executor Relaxation" are used interchangeably.

In steady state, an optimal schedule will exhibit periodic behavior: For each query family $F_i$, wait until $B_i$ queries have arrived on the queue and execute those $B_i$ queries as a batch. Given the arrival rate $\lambda_i$, a new batch is expected to be executed every $T_i = B_i/\lambda_i$ time units. A batch takes time $t_i = t_i^s + (B_i \cdot t_i^n)$ to complete. The fraction of time $F_i$'s executor is in use (rather than idle), is $f_i = (t_i/T_i)$. Thus, various embodiments minimize absolute average PWT for queries in query family queue $F_i$ in the presence of finite resources. Of course use of the executor cannot exceed 1. So, in formal terms, given the use constraint $$\sum_i f_i \le 1,$$

the minimization problem can be expressed as:

$$\min \sum_i \lambda_i \cdot \omega_i^{AA}$$

where $\omega_i^{AA}$ is the average absolute PWT for queries in $F_i$.

There are two factors that contribute to the PWT of a newly-arrived query: (factor 1) the delay until the next batch is formed, and (factor 2) the fact that a batch of size $B_i$ takes longer to finish than a singleton batch. The expected value of factor 1 is $T_i/2$. Factor 2 equals $(B_i-1) \cdot t_i^n$. Overall, $$\omega_i^{AA} = (T_i/2) + (B_i - 1) \cdot t_i^n$$

As is understood by those skilled in the art, one method to solve the above optimization problem is to use the method of Lagrange Multipliers. In the optimal solution the following expression is invariant across all query families $F_i$:

$$\frac{B_i^2}{(\lambda_i \cdot t_i^s)} \cdot (1 + (2 \cdot \lambda_i \cdot t_i^n))$$

Given values for $\lambda$, $t^s$, and $t^n$, one can select batch sizes (B values) accordingly.

Relaxation #2

Unfortunately, the optimal solution to the original problem when applying the Governed Executor Relaxation can differ substantially from the (much harder to solve) optimal solution to the original problem. The optimal policy under the Governed Executor Relaxation schedules query families in a round-robin fashion, yielding an average PWT of O(a). Once again this result is much worse than the theoretically achievable $O(a^{1/2})$ Henceforth the terms "Relaxation #2" and "Modified Governed Executor Relaxation" are used interchangeably.

Returning to the example as shown in FIG. 1C, whereas SJF errs by scheduling $F_2$ too infrequently, the optimized Governed Executor Relaxation policy errs in the other direction: it schedules $F_2$ too frequently. Doing so causes $F_1$ queries to wait behind $F_2$ batches too often, hurting average wait time.

In intuitive terms, the Governed Executor Relaxation reduces the original scheduling problem to a resource allocation problem. That is, under the Governed Executor Relaxation, the only interaction among query families is the fact that they must share the total available processing time from the executor $$\left(\text{i.e., } \sum_i f_i \le 1\right).$$

In reality, resource allocation is not the only important consideration. In embodiments where execution batches must be serialized into a single sequential schedule and executed on a single executor, every other batch must wait for a long time.

To appreciate the contribution of terms under the Modified Goverened Executor Relaxation, consider a query family $F_i$ for which a batch of size $B_i$ is executed once every $T_i$ time units. Whenever an $F_i$ batch is executed, the following contributions to PWT occur:

Contribution to PWT from in-batch queries. The $B_i F_i$ queries in the current batch are delayed by $(B_i-1) \cdot t_i^n$ time units each, for a total of $D_1 = B_i \cdot (B_i-1) \cdot t_i^n$ time units.

Contribution to PWT from appearance of new queries. Queries that arrive while the $F_i$ batch is being executed are delayed. The expected number of such queries is $t_i \cdot \Sigma_j \lambda_j$. The delay incurred to each one is $t_i/2$ on average, making the overall delay incurred to other new queries equal to $$D_2 = \frac{t_i^2}{2} \cdot \sum_j \lambda_j$$

Contribution to PWT from old queries. Queries that are already in the queue when the $F_i$ batch is executed are also delayed. Under the Governed Executor Relaxation, the expected number of such queries is $$\sum_{j \ne i} (T_j \cdot \lambda_j)/2.$$

The delay incurred to each one is $t_i$, making the overall delay incurred to other in-queue queries equal to $$D_3 = \frac{t_i}{2} \cdot \sum_{j \ne i} (T_j \cdot \lambda_j).$$

The total delay imposed on other queries per unit time is proportional to $(1/T_i)(D_1+D_2+D_3)$. Minimizing the sum of this quantity across all families $F_i$, again subject to the resource utilization constraint $$\sum_i f_i \le 1,$$

and using the Lagrange Method, the following quantity is invariant across query families:

$$\frac{B_i^2}{(\lambda_i \cdot t_i^s)} - t_i^s \cdot \sum_j \lambda_j + \frac{B_i^2}{(\lambda_i \cdot t_i^s)} \cdot (\lambda_i \cdot t_i^n) \cdot \left(t_i^n \cdot \sum_j \lambda_j + 1\right)$$

In the two-family scenario discussed supra, the scheduling policy resulting from this invariant does achieve the desired $O(a^{1/2})$ average PWT.

Implementation

Once the mathematical results are understood intuitively, the implementation is straightforward. First, recall the workload feasibility condition $\Sigma_i \lambda_i \cdot t_i^n < 1$. If the executor's load is spread across a large number of query families, then for each $F_i$, $\lambda_i \cdot t_i^n$ is small. Hence, it is reasonable to drop the terms involving the quantity $\lambda_i \cdot t_i^n$ from the above formulae, yielding the following simplified invariants:

Governed Executor Relaxation result: For all query families $F_i$, the following quantity is equal:

$$\frac{B_i^2}{(\lambda_i \cdot t_i^s)}$$

Modified Governed Executor Relaxation result: For all query families $F_i$, the following quantity is equal:

$$\frac{B_i^2}{(\lambda_i \cdot t_i^s)} - t_i^s \cdot \sum_j \lambda_j$$

A simple way to translate these statements into implementable policies is as follows: Assign a numeric priority $P_i$ to each query family $F_i$. Every time the executor becomes idle, then schedule the family with the highest priority as a single batch of $L_i$ queries, where $L_i$ denotes the queue length for family $F_i$. In steady state, $L_i$ should roughly equal $B_i$. This observation suggests the following priority values for the scheduling policies implied by the Governed Executor Relaxation and the Modified Governed Executor Relaxation, respectively:

$$\text{AA Policy 1: } P_i = \frac{L_i^2}{(\lambda_i \cdot t_i^s)}$$

$$\text{AA Policy 2: } P_i = \frac{L_i^2}{(\lambda_i \cdot t_i^s)} - t_i^s \cdot \sum_j \lambda_j$$

These formulae have a fairly simple intuitive explanation. Intuitively, the expression in the denominator of these formulae is the sharability expression of family $F_i$. So, it follows that the larger the value of the sharability expression (in this case the product $\lambda_i \cdot t_i^s$), the greater benefit there can be to waiting for still more potentially sharable queries. That is, if many new queries with a high degree of sharing are expected to arrive in the future, then the scheduler should postpone execution of $F_i$ and allow additional queries to accumulate into the same batch so as to achieve greater sharing with little extra waiting. On the other hand, as the number of enqueued queries becomes large (i.e., the value of $L_i^2$ in the numerator), the execution priority increases quadratically, which eventually forces the execution of a batch from family $F_i$ to avoid imposing excessive delay on the enqueued queries. Of course the sharability expression may be exactly the value obtained from evaluation of the product $\lambda_i \cdot t_i^s$, or it may be $\lambda_i \cdot t_i^s$ in combination with additional terms. For example, various sharability preferences may be provided by values found in the variable pool (e.g. bias against later sharing of particular tables), or as may be provided by the query execution units (bias for earlier execution based on availability of large tables in tiered cache).

Policy 2 has an extra subtractive term, which penalizes long batches (i.e., ones with large $t^s$) if the overall rate of arrival of queries is high $$\left(\text{i.e., large } \sum_j \lambda_j\right).$$

Doing so allows short batches to execute ahead of long batches, in the spirit of shortest-job-first.

For singleton query families (families with just one query), $t_i^s = 0$ and the priority value $P_i$ goes to infinity. Hence non-sharable queries are to be scheduled ahead of sharable ones. Of course, as discussed above, the sharability of singleton query families is assigned to be a small (but non-zero) constant, so the value $P_i$ goes to a large (but less than infinity) value. The intuition is that non-sharable queries cannot be beneficially co-executed with future queries, so the scheduler might as well execute them right away. If there are multiple non-sharable queries, ties can be broken according to FIFO.

As earlier indicated, performance is arguably subjective, but nonetheless a metric for hybrid performance (HP) under AA and MA policies can be defined in easily calculable terms. In order to do so, however, the value for maximum absolute PWT must be first calculated. Here, instead of optimizing for average absolute PWT as described supra, the terms optimize for the maximum. Again, under conditions of a relaxation of the original problem that assumes parallel executors and infinitely divisible work, the objective function is:

$$\min(\max_i(\omega_i^{MA}))$$

where $\omega_i^{MA}$ is the maximum absolute PWT for $F_i$ queries.

There are two factors that contribute to the PWT of a newly-arrived query: (factor 1) the delay until the next batch is formed, and (factor 2) the fact that a batch of size $\beta_i > 1$ takes longer to finish than a singleton batch. The maximum values of these factors are $T_i$ and $(\beta_i - 1) \cdot t_i^n$, respectively. Overall, $$\omega_i^{MA} = T_i + (\beta_i - 1) \cdot t_i^n$$

or, written differently:

$$\omega_i^{MA} = T_i \cdot (1 + \lambda_i \cdot t_i^n) - t_i^n$$

In the optimal solution, $\omega_i^{MA}$ is constant across all query families $F_i$. The intuition behind this result is that if one of the $\omega_i^{MA}$ values is larger than the others, decreasing it somewhat by increasing the other $\omega_i^{MA}$ values thereby reduces the maximum PWT. Hence in the optimal solution all $\omega_i^{MA}$ values are equal.

Implementation

As earlier described, dropping terms involving $\lambda_i \cdot t_i''$ from the $\omega_i^{MA}$ formula results in $\omega_i^{MA} \approx T_i - t_i''$. Under the assumption that the $t''$ values represent a small component of the overall query execution times, and dropping the $-t_i''$ term, the approximation becomes $\omega_i^{MA} \approx T_i$.

Let $W_i$ denote the waiting time of the oldest enqueued $F_i$ query, which should roughly equal $T_i$ in steady state. In such a case, $W_i$ is the basis for the following priority-based scheduling policy:

MA Policy (FIFO): $P_i = W_i$

This policy can be thought of as FIFO applied to query family batches, since it schedules the family containing the query that has been waiting the longest.

Dropping the non-sharable execution time $t''$ from the priority policy formulae not only keeps the policies simple, it also means that the scheduler does not need to estimate this quantity. In practice, estimating the full execution time of a query accurately can be difficult, and $t''$ may differ across queries in the same family. Moreover, one can show empirically that the performance of the policies disclosed herein are not sensitive to whether the factors involving $t''$ are included or not.

Inasmuch as the formulae for priority policies do require estimates of the sharable execution time $t^s$, it is desirable to identify a practical technique for such an estimation. In practice the dominant sharable execution component is often the I/O time for reading the input tables. In this case $t^s$ is roughly proportional to the input data size of each query family. This number is typically easy to obtain from the system catalog. Other estimation function are envisioned including an estimation function the includes a lookup from a table of previously estimated resources. Some embodiments of such an estimation include maintaining a table containing the average actual I/O time required for reading a given input table. In such a manner, conditions of the computing system may be factored in to the estimations.

Lastly, some of the priority formulae contain $\lambda$ values, which denote query arrival rates. Under the Poisson model of arrival, one can estimate the $\lambda$ values by keeping a time-decayed count of arrivals and calculating the estimate for $\lambda$ (at that moment in time). Note that the inter-arrival times of a homogenous Poisson point process with parameter $\lambda$ exhibits an exponential distribution with mean $1/\lambda$. Thus following one standard model for a Poisson point process, one may estimate the inter-arrival times as $I_j = 0.05 A_j + 0.95 I_{j-1} T_j$ where $A_j = 0.05 A_j + 0.95 I_{j-1}$ where $A_j$ is the $j^{th}$ inter-arrival time. If the time t since the last query is greater that $I_j$, then estimate $\lambda_i$ as $1/(0.05t + 0.95 I_j)$; otherwise, estimate $\lambda_i$ as $1/I_j$. To emphasize practical embodiments for lambda estimation, the aforementioned technique to keep a time-decayed count of arrivals is operable to continuously and periodically update the time-decayed (averaged) counts so as to more fairly represent the likelihood of occurrence of an incoming query for the corresponding query family queue. Moreover, standard model coefficients 0.05 and 0.95 may be tuned. As such the estimate for inter-arrival times can be generalized as $I_j = pA_j + (1-p)I_{j-1} T_j$, where $0 < p < 1$. Intuitively, this time-decayed estimation fairly models the time-varying popularity of queries corresponding to a particular query family queue.

To validate ignoring $t''$ in the scheduling policies, experimental results compare $t''$-aware variants (which use the full formulae with $t''$ values) against the $t''$-ignorant variants earlier presented. The $t''$-aware variants are given knowledge of the precise $t''$ value of each query instance in the queue.

Figure 6A:
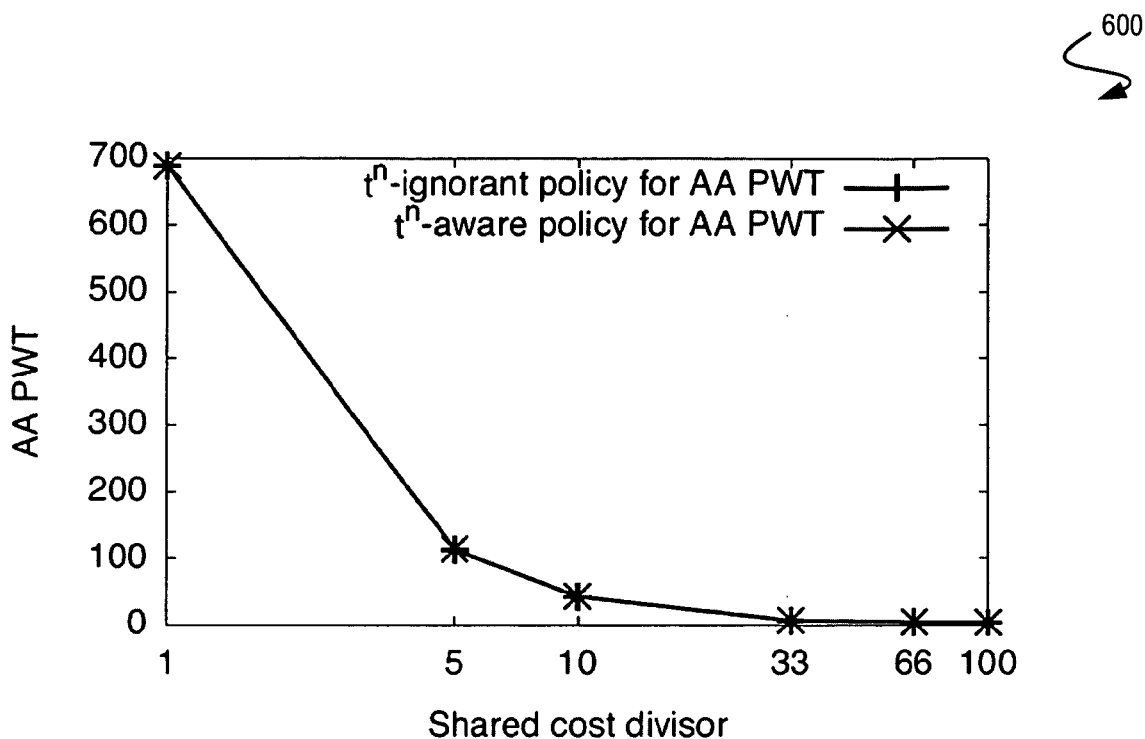
FIG. 6A is a graph of the comparison of policies for average absolute perceived wait time, according to some embodiments.
Figure 6B:
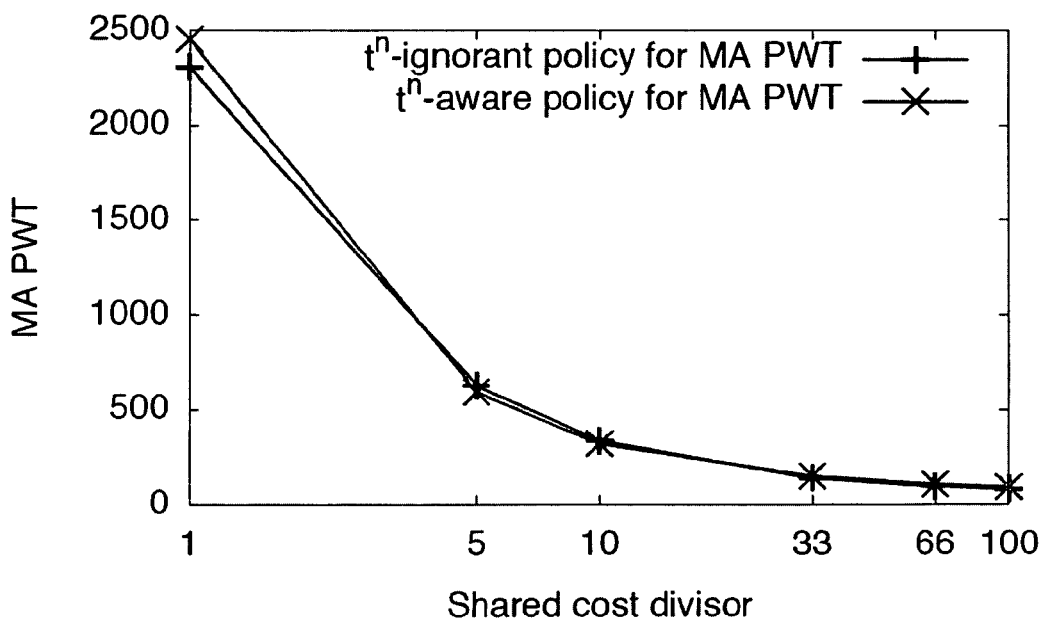
FIG. 6B is a graph of the comparison of policies for maximum absolute perceived wait time, according to some embodiments.

The graphs of FIG. 6A and FIG. 6B plot the performance of the $t''$-aware and $t''$-ignorant variants of the policies for AA and MA, respectively, as the magnitude of the shared cost is varied (while keeping the $t''$ distribution and $\lambda$ values fixed). In these graphs, the y-axis plots the metric that the policy is tuned to optimize. The x-axes plot the shared cost divisor, which is the factor by which all shared costs are divided. When the shared cost divisor is large (e.g., 100), the $t^s$ values become quite small relative to the $t''$ values, on average.

As is evident from the plots of FIG. 6A and FIG. 6B, even when non-shared costs are large relative to shared costs, $t''$-awareness has little impact on performance as optimized individually for AA and MA, respectively.

Figure 7A:
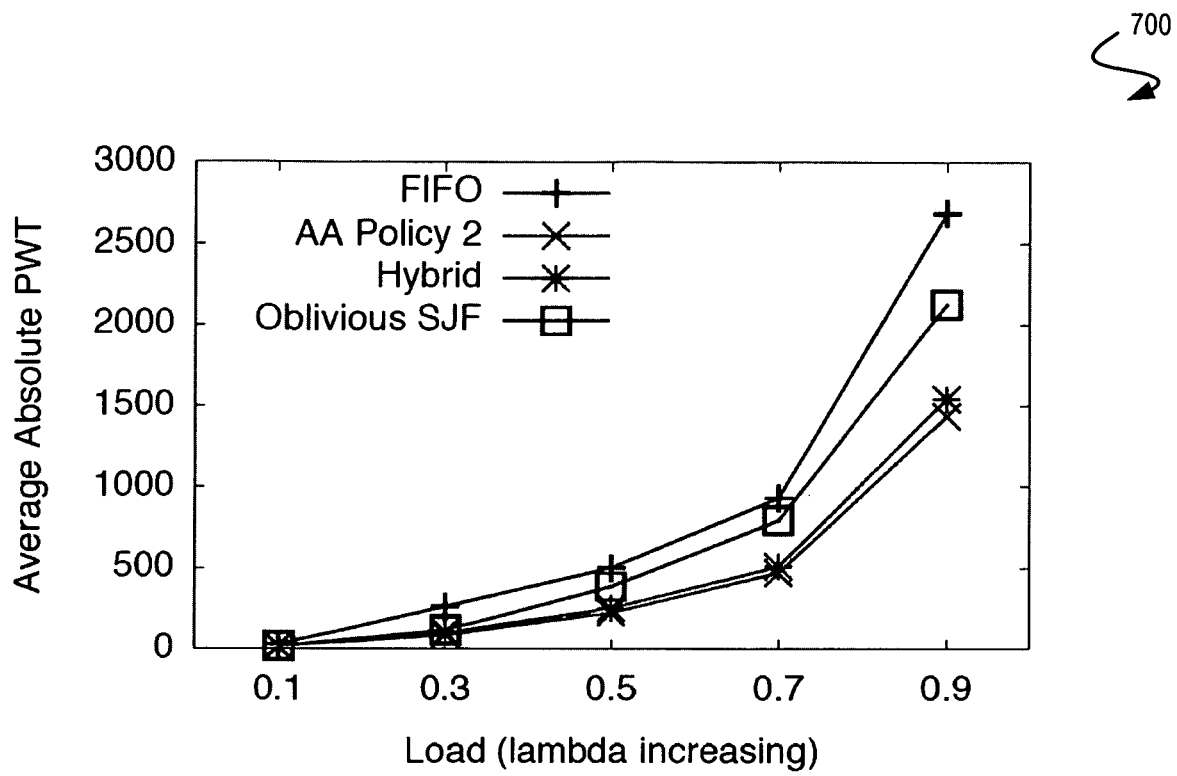
FIG. 7A is a graph of the comparison of policies for average absolute perceived wait time, according to some embodiments.
Figure 7B:
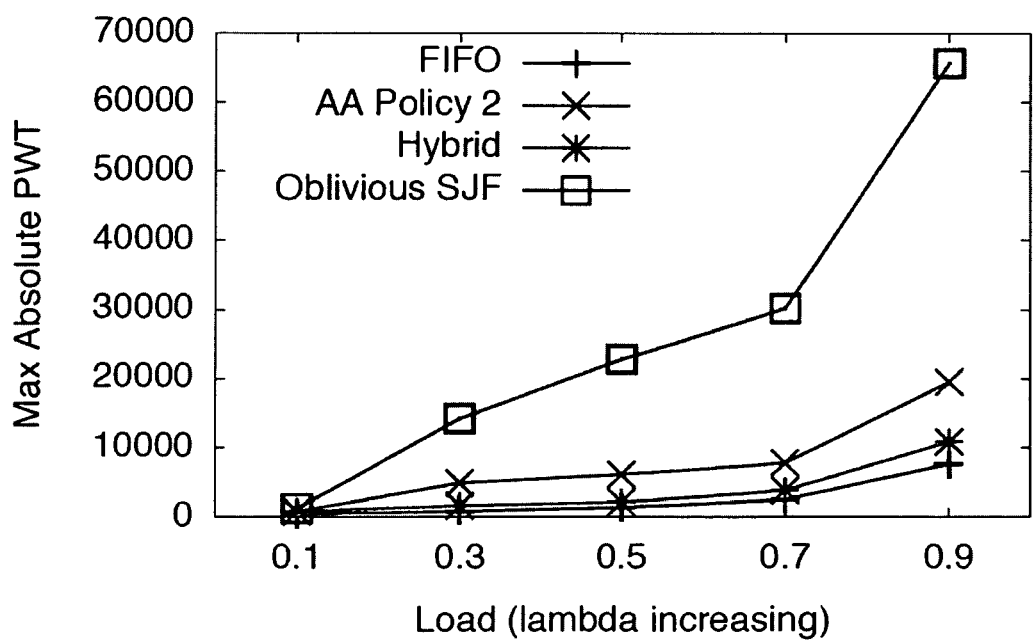
FIG. 7B is a graph of the comparison of policies for maximum absolute perceived wait time, according to some embodiments.

The graphs of FIG. 7A and FIG. 7B plot the performance of the preferred policies for AA and MA, respectively, as the magnitude of query arrival is varied. As shown, the performance of the preferred policies either do not diverge, or they diverge acceptably from the performance of other scheduling policies. Accordingly in preferred embodiments, the query arrival rate may be estimated.

Thus embodiments using the simplified shared cost divisor can be mapped directly from the relaxed policy formulae into a method, and/or a computer product embodied on a tangible computer-readable medium, and/or in/on an apparatus for carrying out the aforementioned method.

Figure 4:
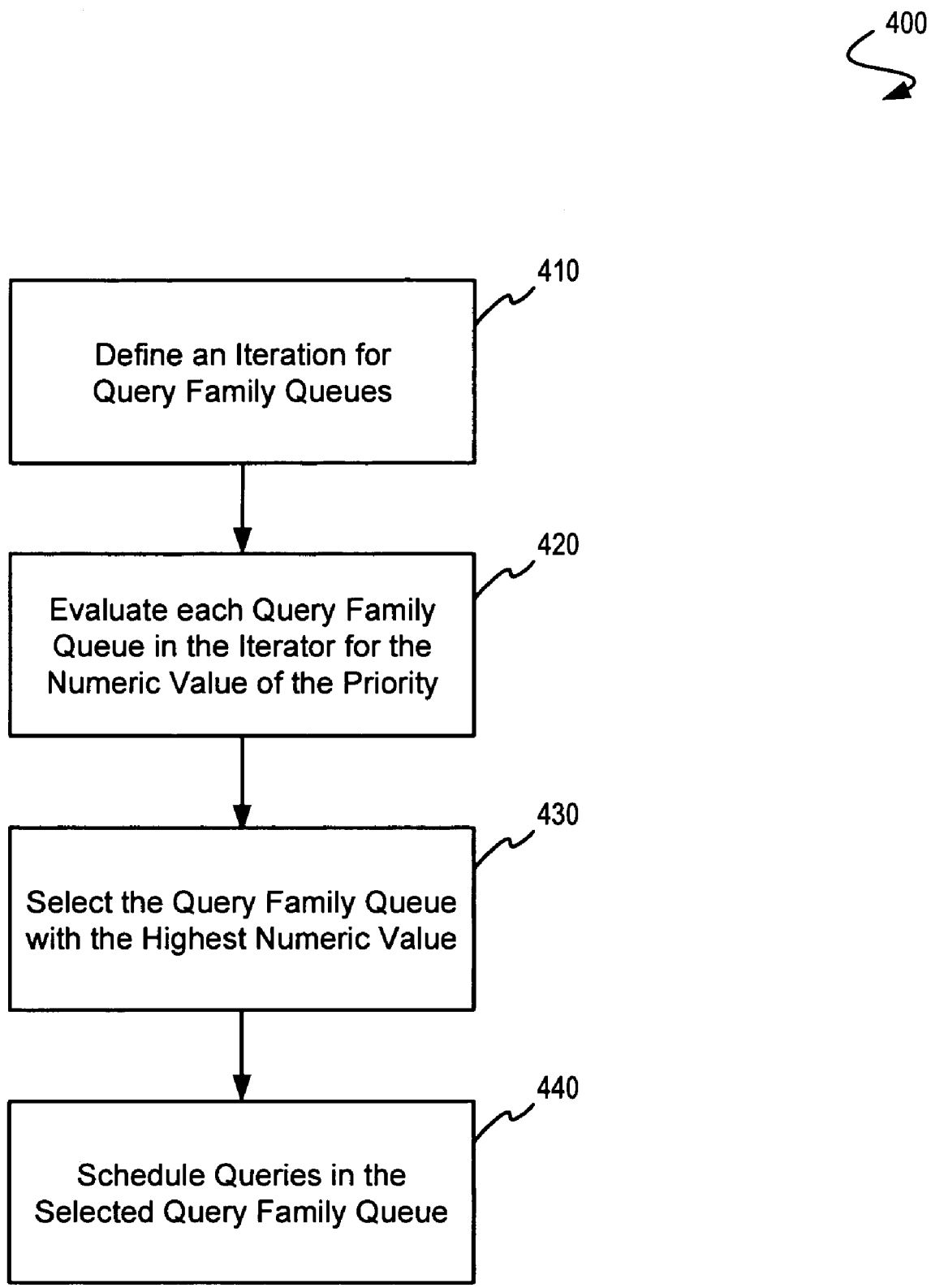
FIG. 4 is a depiction of a method to prioritize query family queues, according to some embodiments.

FIG. 4 depicts a method for selecting queries for execution 400. The method is comprised of operations to define an iteration for query family queues 410, an operation to evaluate each query family queue in the iterator 420, an operation to select the query family queue with the highest numeric value 430, and an operation to schedule queries from the selected query family for execution 440. This method 400 may be implemented in the context of the system for managing queries for execution 200 or in the context of any operation shown in FIG. 2A through FIG. 3.

The operation to define an iteration for query family queues 410 may be implemented as any sort of collection such as an array or a list. The iterator may be defined at the time of initialization of the system 200, or it may be defined at the time of any execution of operation 410, or at any point in between. Regardless of the representation of the iterator, the collection is initialized with a representation of each and every known query family queues. Of course, rules or heuristics (e.g., rules to remove query family queues with no pending queries) may be applied to the iterator collection.

The operation to evaluate each query family queue in the iterator 420 for priority may be directly implemented as an algorithm for calculation of each and every query family queue in the aforementioned iterator. The calculations may include any (or all) of the policy expressions $P_{Policy}$ (e.g., any of the expressions for $P_i$). In some embodiments, the calculation may include FIFO or SJF. In still other embodiments the calculations may include any (or all) of the hybrid performance expressions HP (e.g., any of the expressions for $HP_{AA:MA}$, $HP_{AR:MR}$, etc.). In preferred embodiments, the calculations may include any or all of the results of the method for calculating and storing the sharability of a given query family queue 500, infra.

The operation to select the query family queue with the highest numeric value 430 may be implemented as a 'maximum' function. Or it may be implemented as a maximum function with some technique for breaking ties, or any other technique for identifying a maximum such that exactly one query family queue is selected in this operation 430.

The operation to schedule queries from the selected query family for execution 440 collects queries from the selected query family queue into a batch of queries and may store the batch for presentation to one or more query execution units. Presentation may be implemented in some embodiments by storing the batch of queries in volatile or non-volatile memory, and optionally sending a message to one or more query execution units that work is available.

Figure 5:
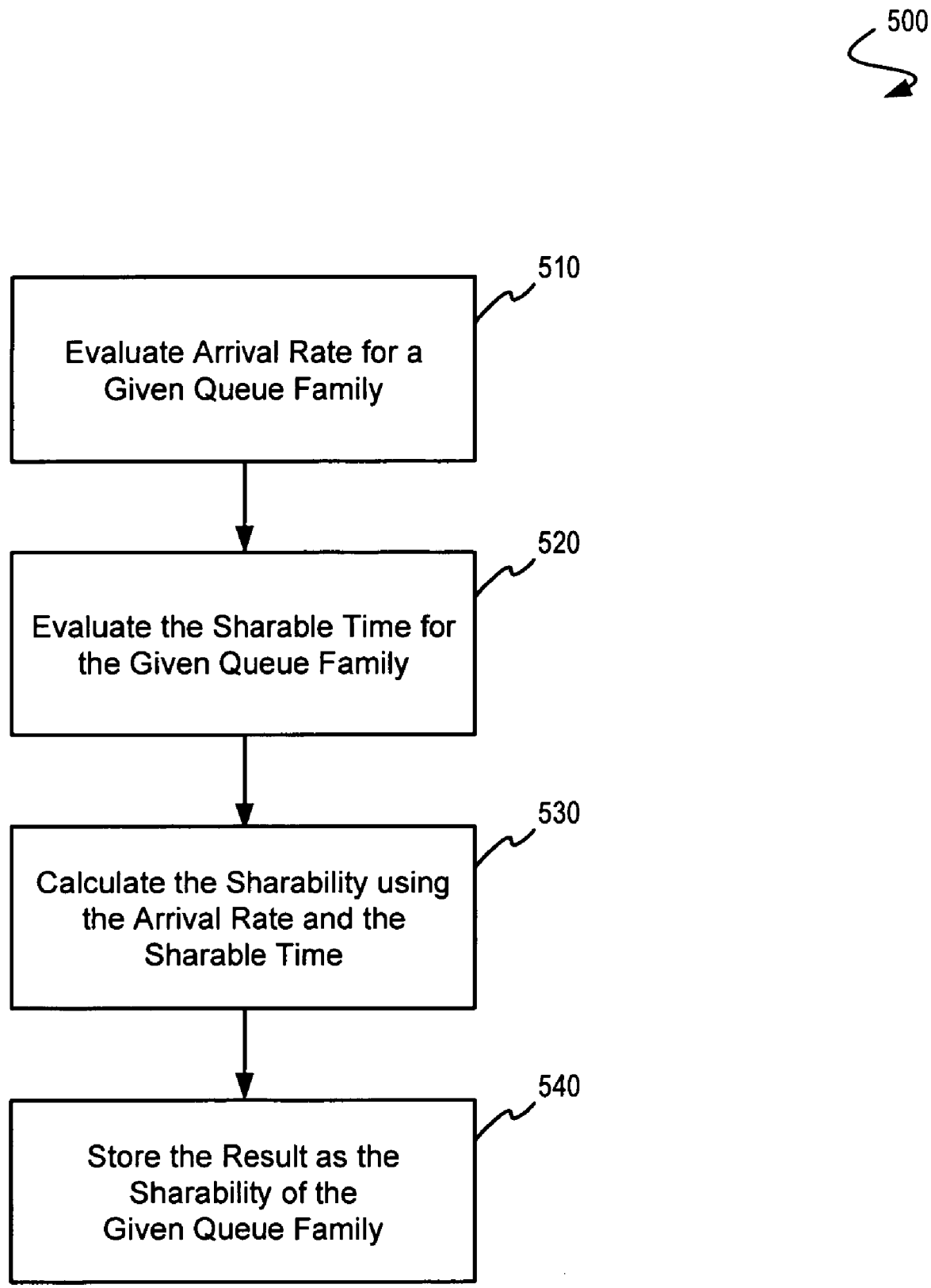
FIG. 5 is a depiction of a method to evaluate sharability of a queue family, according to some embodiments.

FIG. 5 depicts a method for calculating and storing the sharability of a given query family queue 500. This method may be implemented in the context of the system for managing queries for execution 200 or in the context of any operation shown in FIG. 2A through FIG. 4. In the embodiment shown, the method for calculating and storing the sharability of a given query family queue 500 comprises an operation for evaluating the predicted arrival rate of a query for a given query family queue 510, an operation for evaluating the sharable time of the query family queue 520, an operation for calculating the sharability value using an arrival rate value and a sharable time value 530, and an operation for storing results of the operations 540.

The operation for evaluating the predicted arrival rate of a query for a given query family queue 510 may use the technique of keeping a time-decayed count of arrivals, and calculating the estimate for $\lambda$ (at that moment in time). In some embodiments, relatively simpler techniques even involving constants, may be included.

The operation for evaluating the sharable time of the query family queue 520 may employ well known techniques such as estimating on the basis of the size of a table, and/or on the basis of the structural organization of a table, or the relative or absolute complexity of an operation to be performed in the query. In some embodiments, the estimate may be made on the basis of multiple variables, based on heuristics, or in the case of multiple variables the estimate may be made on the basis of the value of a polynomial involving one or more of those multiple variables. In preferred embodiments, the operation for calculating the sharability value uses an arrival rate value from operation 510 and a sharable time value from operation 520 in order to calculate the sharability product $(\lambda_i \cdot t_i^s)$.

The operation for storing results of the operations 540 may in fact store this result in some non-volatile storage, or the operation may store the result in volatile memory for access by other operations.

The system for query scheduling to maximize work sharing may be implemented in either hardware or software. For the hardware implementation, the system for query scheduling to maximize work sharing is a computing resource or a collection of computing resources that may include computing resources available in or on one or more computer systems. For the software implementation, the system for query scheduling to maximize work sharing is software that includes a plurality of computer executable instructions for implementation on a general-purpose computer system. Prior to loading into a general-purpose computer system, the system for query scheduling to maximize work sharing software may reside as encoded information on a tangible computer readable medium, such as a magnetic floppy disk, magnetic tape, or compact disc read only memory (CD-ROM).

Although the present invention has been described in terms of specific exemplary embodiments, it will be appreciated that various modifications and alterations might be made by those skilled in the art without departing from the spirit and scope of the invention.

We claim:

1. A computer-implemented method for scheduling queries to account for future queries possessing in a sharability component comprising:

receiving, at a computer, an incoming query;

determining, in a computer, sharability characteristic information between the incoming query and one or more previously received queries, wherein the sharability characteristic information identifies whether one or more equivalent operations exist between the incoming query and the previously received queries;

assigning, in a computer, said incoming query to a first query queue among a plurality of query queues, based on said sharability characteristic information, so as to identify the first query queue as storing the previously received queries that comprise more equivalent operations with said incoming query than other of said query queues;

evaluating, in a computer, at least one priority function for each query-queue among the plurality of query queues to identify at least one highest priority query queue, wherein said priority function includes a probability attribute denoting a likelihood that a future query will be assigned to a query queue based on the sharability characteristic information between the future query and one or more previously received queries stored in the query queue among the plurality of query queues;

selecting, in a computer, a set of queries from said highest priority query queue into a batch of queries; and assigning, in a computer, said batch of queries to at least one query execution unit to execute the batch queries.

2. The computer-implemented method of claim 1 wherein evaluating at least one priority function includes estimating the query arrival rate for each member of the plurality of the query queues.

3. The computer-implemented method of claim 1 wherein evaluating at least one priority function includes estimating the sharable time for each query in said each member of the plurality of the query queues.

4. The computer-implemented method of claim 1 wherein evaluating at least one priority function includes evaluating a sharability expression for each query in said each member of the plurality of the query queues.

5. The computer-implemented method of claim 1 wherein selecting a set of queries from said highest priority query queue into a batch of queries includes storing the batch of queries in a volatile or non-volatile memory.

6. The computer-implemented method of claim 1 wherein selecting the set of queries from said highest priority query queue into the batch of queries includes sending a message to one or more query execution units that work is available.

7. A computer readable storage medium having a computer program product stored thereon, which is processed by a computer processor for scheduling queries to account for future queries possessing in a sharability component, comprising:

receiving an incoming query in a computer;

determining sharability characteristic information between the incoming query and one or more previously received queries, wherein the sharability characteristic information identifies whether one or more equivalent operations exist between the incoming query and previously received queries;

assigning said incoming query to a first query queue among a plurality of query queues based on said sharability characteristic information, so as to identify the first query queue as storing the previously received queries that comprise more equivalent operations with said incoming query than other query queues;

selecting a set of queries from a highest priority query queue into a batch of queries; and assigning said batch of queries to at least one query execution unit to execute the batch queries.

8. The computer readable storage medium of claim 7 wherein the step of determining sharability characteristic information includes estimating the sharable time for each query in said plurality of query queues.

9. The computer readable storage medium of claim 7 wherein the step of determining sharability characteristic information includes estimating the sharability for each query in said plurality of query queues.

10. The computer readable storage medium of claim 7 wherein the step of selecting a set of queries from a highest priority query queue includes storing a batch of queries in a volatile or non-volatile memory.

11. The computer readable storage medium of claim 7 wherein the step of assigning said batch of queries to at least one query execution unit includes sending a message to at least one query execution unit.

12. A computerized apparatus, comprising:

at least one computer processor coupled to at least one memory module and at least one computer-readable storage medium for:

receiving an incoming query by the at least one computer;

determining sharability characteristic information between the incoming query and one or more previously received queries, wherein the sharability characteristic information identifies whether one or more equivalent operations exist between the incoming query and the previously received queries;

assigning said incoming query to a first query queue among a plurality of query queues, based on said sharability characteristic information, so as to identify the first query queue as storing the previously received queries that comprise more equivalent operations with said incoming query than other query queues;

evaluating at least one priority function for each query queue among the plurality of query queues to identify at least one highest priority query queue, wherein said priority function includes a probability attribute denoting a likelihood that a future query will be assigned to a query queue based on the sharability characteristic information, between the future query and one or more previously received queries stored in one of query queue among the plurality of query queues;

selecting a set of queries from said highest priority query queue into a batch of queries; and assigning said batch of queries to at least one query execution unit to execute the batch queries.

13. The computerized apparatus of claim 12 wherein said execution unit for evaluating an incoming query creates at least one query family queue.

* * * * *